United States Patent
Dillen

(10) Patent No.: US 9,288,878 B2
(45) Date of Patent: Mar. 15, 2016

(54) COMMISSIONING LIGHTING SYSTEMS

(71) Applicant: KONINKLIJKE PHILIPS N.V., Eindhoven (NL)

(72) Inventor: Paulus Henricus Antonius Dillen, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/351,992

(22) PCT Filed: Oct. 12, 2012

(86) PCT No.: PCT/IB2012/055557
§ 371 (c)(1),
(2) Date: Apr. 15, 2014

(87) PCT Pub. No.: WO2013/057646
PCT Pub. Date: Apr. 25, 2013

(65) Prior Publication Data
US 2014/0265879 A1   Sep. 18, 2014

Related U.S. Application Data

(60) Provisional application No. 61/547,892, filed on Oct. 17, 2011.

(51) Int. Cl.
*H05B 37/02* (2006.01)
(52) U.S. Cl.
CPC ........ *H05B 37/0227* (2013.01); *H05B 37/0254* (2013.01); *Y02B 20/44* (2013.01)

(58) Field of Classification Search
CPC .............................. H05B 37/0227; H05B 37/02
USPC .................................. 315/153, 292, 297, 308
See application file for complete search history.

(56) References Cited

U.S. PATENT DOCUMENTS

| | | | |
|---|---|---|---|
| 2008/0225521 A1 | 9/2008 | Waffenschmidt et al. | |
| 2008/0265799 A1* | 10/2008 | Sibert | 315/292 |
| 2010/0201267 A1 | 8/2010 | Bourquin et al. | |
| 2010/0329691 A1 | 12/2010 | Schenk et al. | |
| 2012/0206051 A1* | 8/2012 | Nieuwlands | 315/153 |

FOREIGN PATENT DOCUMENTS

| | | |
|---|---|---|
| WO | 0213490 A2 | 2/2002 |
| WO | 2005096677 A1 | 10/2005 |
| WO | 2006095317 A1 | 9/2006 |
| WO | 2006136985 A1 | 12/2006 |
| WO | 2007102114 A1 | 9/2007 |
| WO | 2007119126 A2 | 10/2007 |

(Continued)

*Primary Examiner* — Daniel D Chang
(74) *Attorney, Agent, or Firm* — Meenakshy Chakravorty

(57) ABSTRACT

A lighting system includes luminaires (L,1, L,2) disposed in a space to be illuminated, a sensor system (S1, S2) to detect user presence within the space, and a controller (2) configured in a commissioning mode to receive data corresponding to the addresses of luminaires which are to be defined as a group, and positional data from the sensor system in response to commissioning actuator e.g. a person moving along a path associated with a region of the space associated with the group, and in an operational mode to illuminate the luminaires of the group in response to the sensor system detecting occupancy in the region associated with the group.

15 Claims, 6 Drawing Sheets

(56) References Cited

FOREIGN PATENT DOCUMENTS

| WO | 2008001267 | A2 | 1/2008 |
| WO | 2008135942 | A1 | 11/2008 |
| WO | 2009003279 | A1 | 1/2009 |
| WO | 2009010926 | A2 | 1/2009 |
| WO | 2010100586 | A2 | 9/2010 |
| WO | 2011030292 | A1 | 3/2011 |
| WO | 2011055259 | A1 | 5/2011 |

* cited by examiner

COMMISSIONING LIGHTING SYSTEMS

FIELD OF THE INVENTION

This invention relates to commissioning lighting systems.

BACKGROUND OF THE INVENTION

Networked lighting systems are used for commercial and other premises and may be managed from a central location to simplify maintenance and optimize energy consumption.

Once initially installed, the lighting system needs to be commissioned so as to associate switches and sensors with one or more luminaires. Hitherto, the commissioning has been carried out by a manual process of association so that the luminaires can be operated individually or in groups by specific switches and sensors, with the overall network being managed by a central controller. As a result, the commissioning of a lighting network is currently a labor intensive and error prone process.

SUMMARY OF THE INVENTION

The invention provides a lighting system including: a plurality of luminaires disposed in a space to be illuminated, a sensor system to detect user presence within the space, and a controller configured in a commissioning mode to receive data corresponding to the addresses of luminaires which are to be defined as a group, and to receive positional data from the sensor system in response to commissioning actuator moving along a path associated with a region of the space associated with the group, and in an operational mode to illuminate the luminaires of the group in response to detecting occupancy in the region associated with the group.

Thus, there is no need to commission the luminaires one by one.

The invention further includes a network controller for a lighting network that includes a plurality of luminaires disposed in a space to be illuminated and a sensor system to detect user position within the space, the controller being configured to operate:

in a commissioning mode to receive data corresponding to the addresses of luminaires which are to be defined as a group, and to receive positional data from the sensor system in response to a commissioning actuator moving along a path in the space around the group, and in an operational mode to illuminate the luminaires of the group in response to the sensor system detecting occupancy in the region associated with the group during the commissioning mode.

The invention also includes a method of commissioning a lighting network and computer program to be run by the controller to perform the method.

BRIEF DESCRIPTION OF THE DRAWINGS

Embodiments of the invention will now be described by way of illustrative example with reference to the accompanying drawings in which.

DETAILED DESCRIPTION

Figure 1:
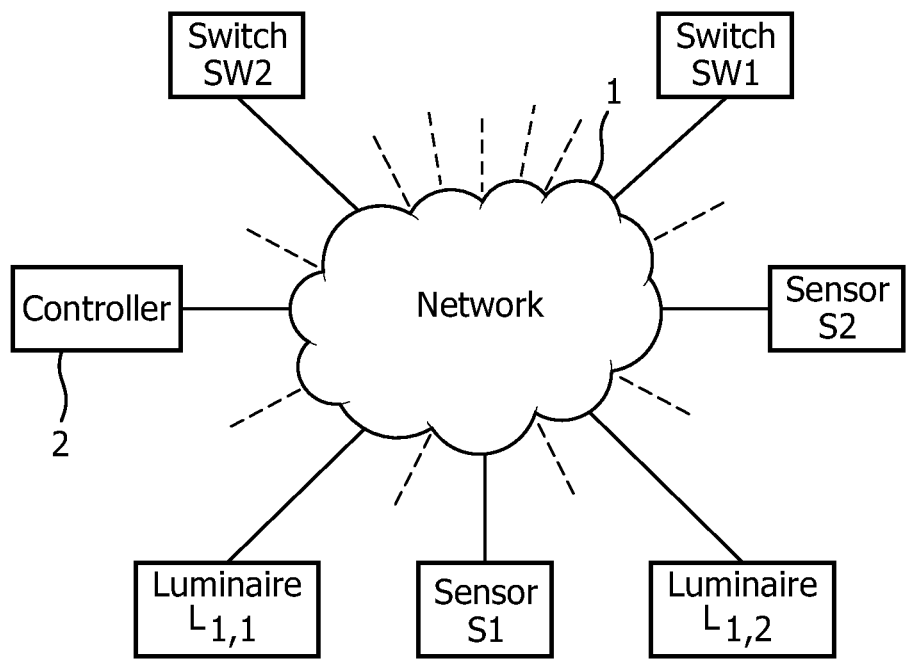
FIG. 1 is a schematic block diagram of a lighting network.

FIG. 1 illustrates a networked lighting system in that an array of luminaires $L_{1,1}$, $L_{1,2}$ are connected in a network 1 with control switches SW1, SW2 and present sensors such as passive infrared (PIR) sensors S1, S2, under the control of a central controller 2. The network 1 may extend throughout the premises, for example on more than one floor. The premises may comprise an office building, warehouse or other commercial domestic premises. Suitable protocols for the network 1 include, but are not limited to, Digital Address Lighting Interface (DALI), Zigbee, LLM, Dianet, Star sense, ethernet and wi-fi.

Each of the luminaires, switches and sensors has an individual, unique network address (such as an IP address) and control signals can be sent to and from them through the network in order to control operation of the luminaires.

The example described herein by way of illustration may make use of the DALI protocol. When the network is initially installed, a commissioning process needs to be carried out in order to associate individual luminaires with particular spaces within the premises to be controlled in a group either by the main controller 2 or individual associated switches and sensors S, SW.

Figure 2:
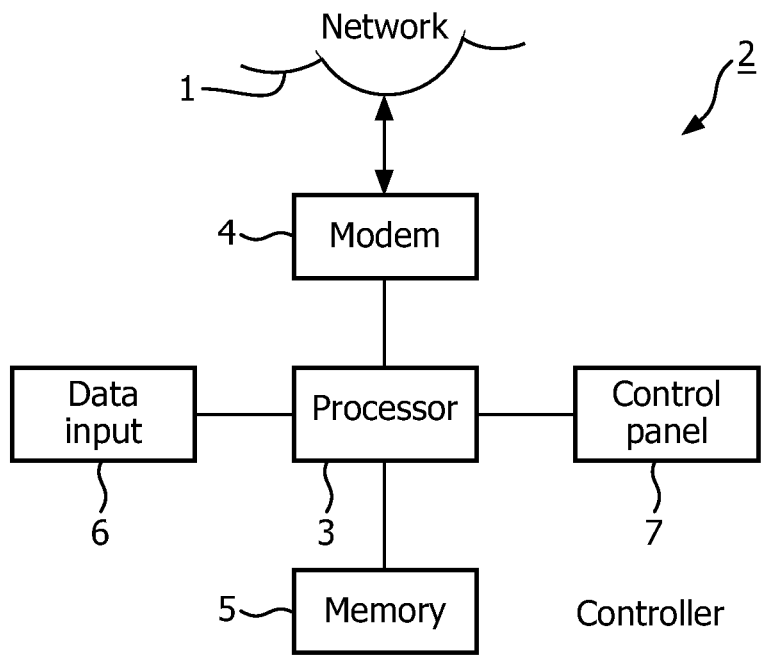
FIG. 2 is a block diagram of a controller for the network.

Referring to FIG. 2, the main controller 2 is illustrated in more detail and comprises the processor 3 that is coupled through modem 4 to the network 1. The memory 5 includes amongst other things data concerning the network addresses of various switches, sensors and luminaires in the network so that control commands can be sent to them individually under the control of information provided through a data input 6. Operation of the network can be monitored from a control panel 7.

Figure 3:
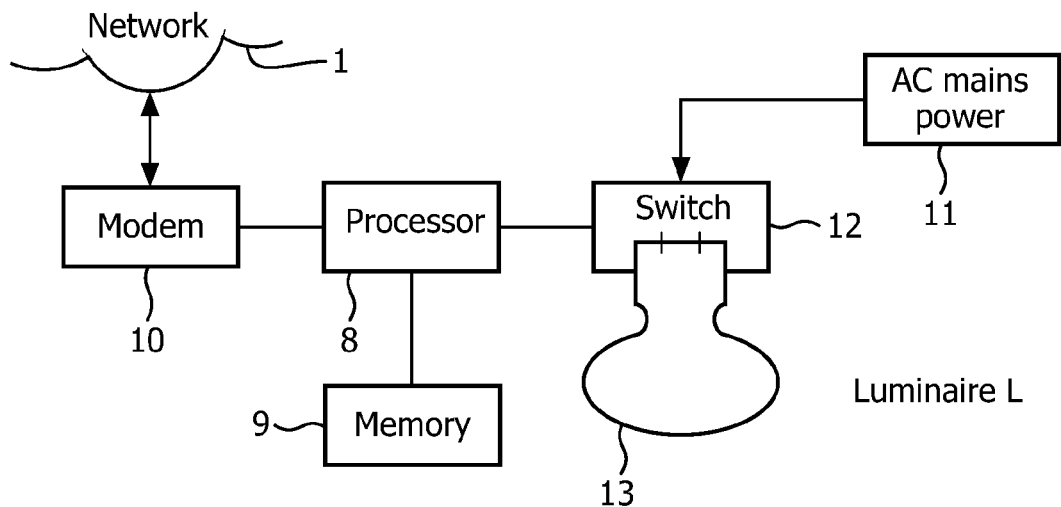
FIG. 3 is a schematic block diagram of a luminaire.

A block diagram of one of the luminaires is illustrated in FIG. 3. The luminaire includes a processor 8 within associated memory 9 that holds an individual network address for the luminaire. Command signals are received from the controller 2 and associated switches and sensors through the network 1 via modem 10. The processor 8 controls a supply of electrical AC mains power from inlet 11 by means of a switch 12 that switches the AC supply to a lighting element 13, for example a fluorescent tube or other electrical lighting element.

Figure 4:
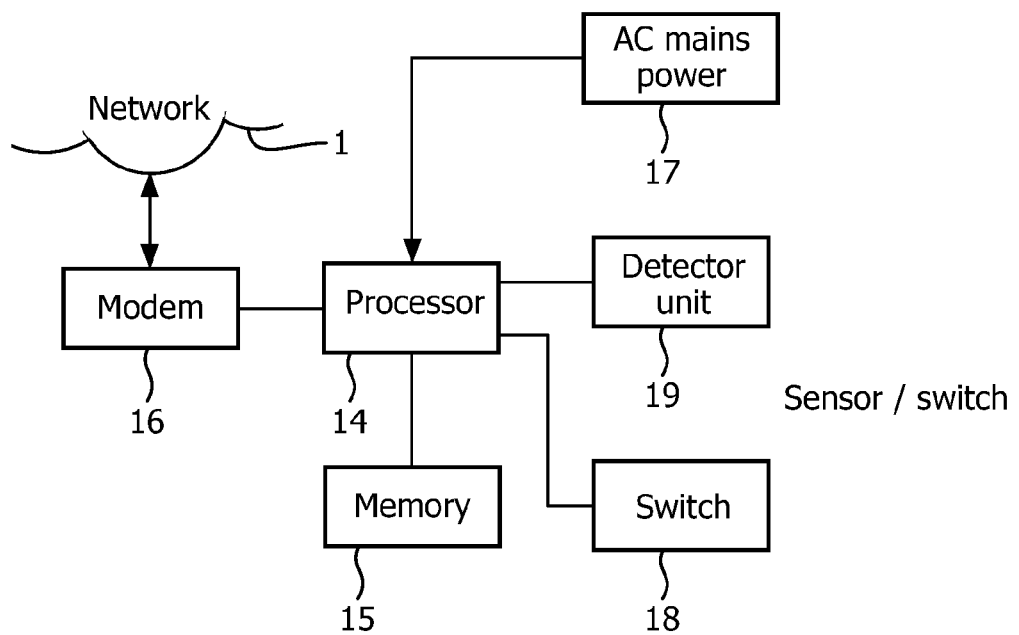
FIG. 4 is a block diagram of a sensor for use in the network.

FIG. 4 is a block diagram of the major components of one of the sensors and/or switches S and SW shown in FIG. 1, which includes a processor 14 with an associated memory 15 that holds a network address. The processor 14 communicates with the network 1 through modem 16 and is powered by AC mains power 17. For the switch SW, a manually operated switch element 18, for example a wall switch, provides on/off signals to the processor 14 which can be used to provide on/off signals that are fed to individual luminaires through the network by modem 16.

When used as sensor S, a detector unit 19 may be used to detect movement in an individual part of the workspace, which is fed to processor 14 to provide a command signal via modem 16 and network 1 to switch on individual one(s) of the luminaires. An example of the detector unit 19 is a passive infrared (PIR) sensor such as from the Philips Dynalite range. These are non-directional sensors which detect motion by detecting variations in infrared light. The infrared sensor has an omnidirectional directive pattern of sensitivity which can be illustrated graphically as a circle around its infrared detector.

Figure 5:
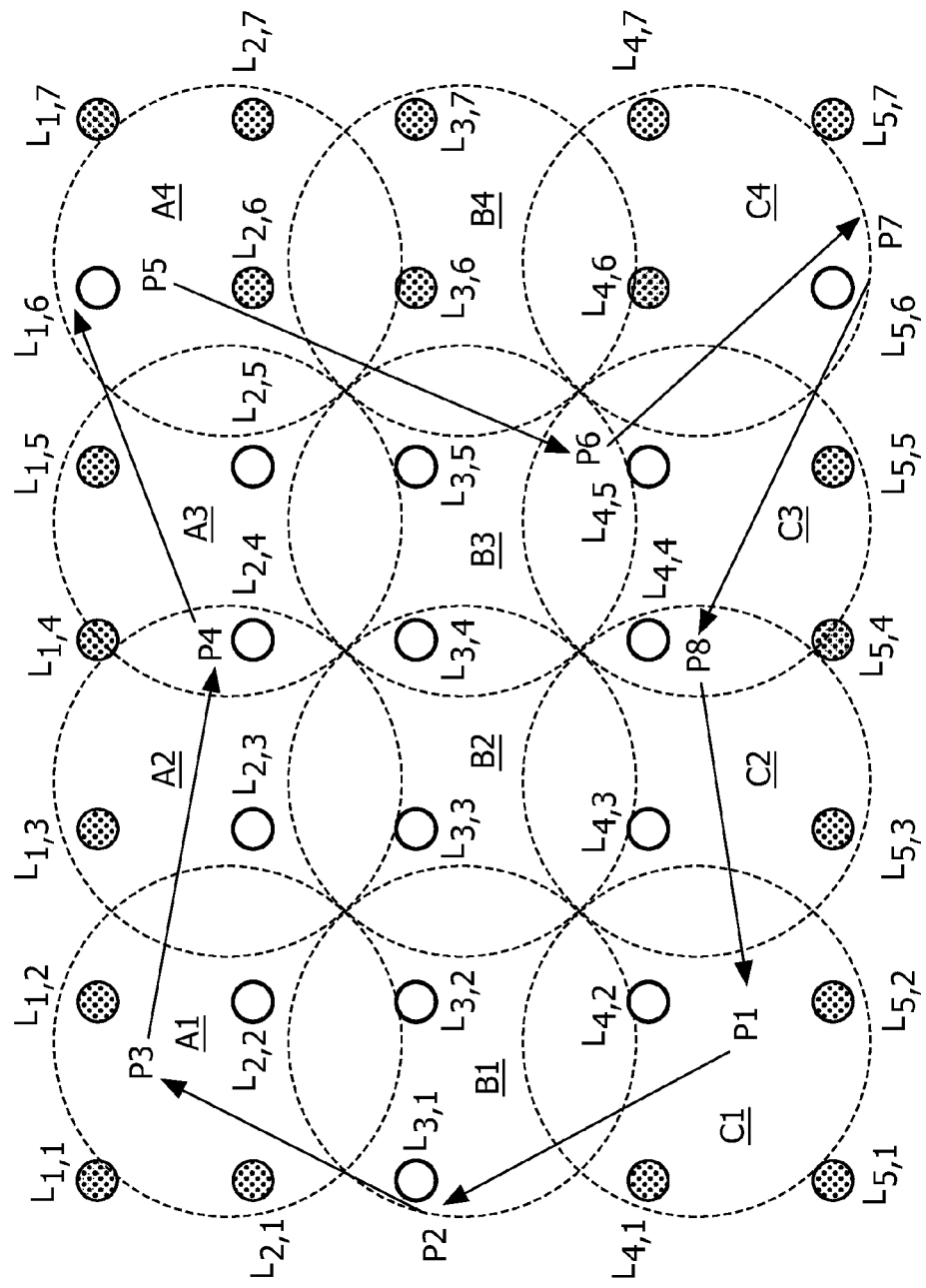
FIG. 5 is a plan view of a space including luminaires of the network and sensor for use with the network.

Referring to FIG. 5, a plan view of premises that include a rectangular array of ceiling mounted luminaires is illustrated, comprising luminaires $L_1 1 \ldots L_{6,7}$ in a rectangular, equally spaced array. The space also includes an array of ceiling mounted PIR detectors as just described, with circular directive patterns covering areas A1-A4; B1-B4 and C1-C4. The areas of sensitivity of the sensors S are arranged to overlap. Thus, for example, the area A1 is overlapped by areas A2 and B1. This overlap is used in order to allow a positional discrimination to be achieved within the circular area of sensitivity of each PIR sensor S during the commissioning process.

It will be understood that when the lighting network is initially installed, although each of the luminaires sensors and switches have individual network addresses, they are not initially associated in groups, for example for illuminating particular work areas within the space shown in FIG. 5. In order to perform commissioning, the luminaires to be included within a particular group are initially switched on manually by the person performing the commissioning, referred to herein as the commissioning actuator. The central controller 2 is switched into a commissioning mode during which the luminaires that have been switched on to be grouped together, send their individual network addresses from their respective memories 9 through their modems 10 and network 1 to controller 2, where they are stored temporarily in memory 5 for further processing. The commissioning actuator then walks or otherwise moves along a path around the group of luminaires that have been switched on.

The luminaires that have been switched on to be formed into a group are shown as white circles in FIG. 5 whereas the luminaires that remain switched off are shown in grey. The commissioning actuator walks along a path from position P1 to P2 . . . P8. When in position P1, the commissioning actuator is sensed solely by the sensor S associated with sensor area C1. Similarly, in positions P2 and P3 the commissioning actuator sensed to be within sensor areas B1 and A1 respectively. However, at position P4, a commissioning actuator is sensed to be in both areas A2 and A3 concurrently. The sensors associated with the areas A, B, C transmit detection signals through the network 1 to the controller 2 and in this way, the controller 2 can build up series of coordinates of a path that extends around the luminaires that are to be included within the group. The resulting group can also be associated with individual ones of the switches SW.

The commissioning process may be repeated for other groups or sub groups of luminaires within the premises. Thus, the commissioning actuator when travelling along the path P1-P8 defines coordinates that are sensed by the sensors so as to determine the region in the space that is to be associated with the group of luminaires. This avoids the need to switch on the luminaires individually and associate them with the group one-by-one at the central controller 2 by repeated journeys back and forth to the central controller 2 and the individual luminaires.

Figure 6:
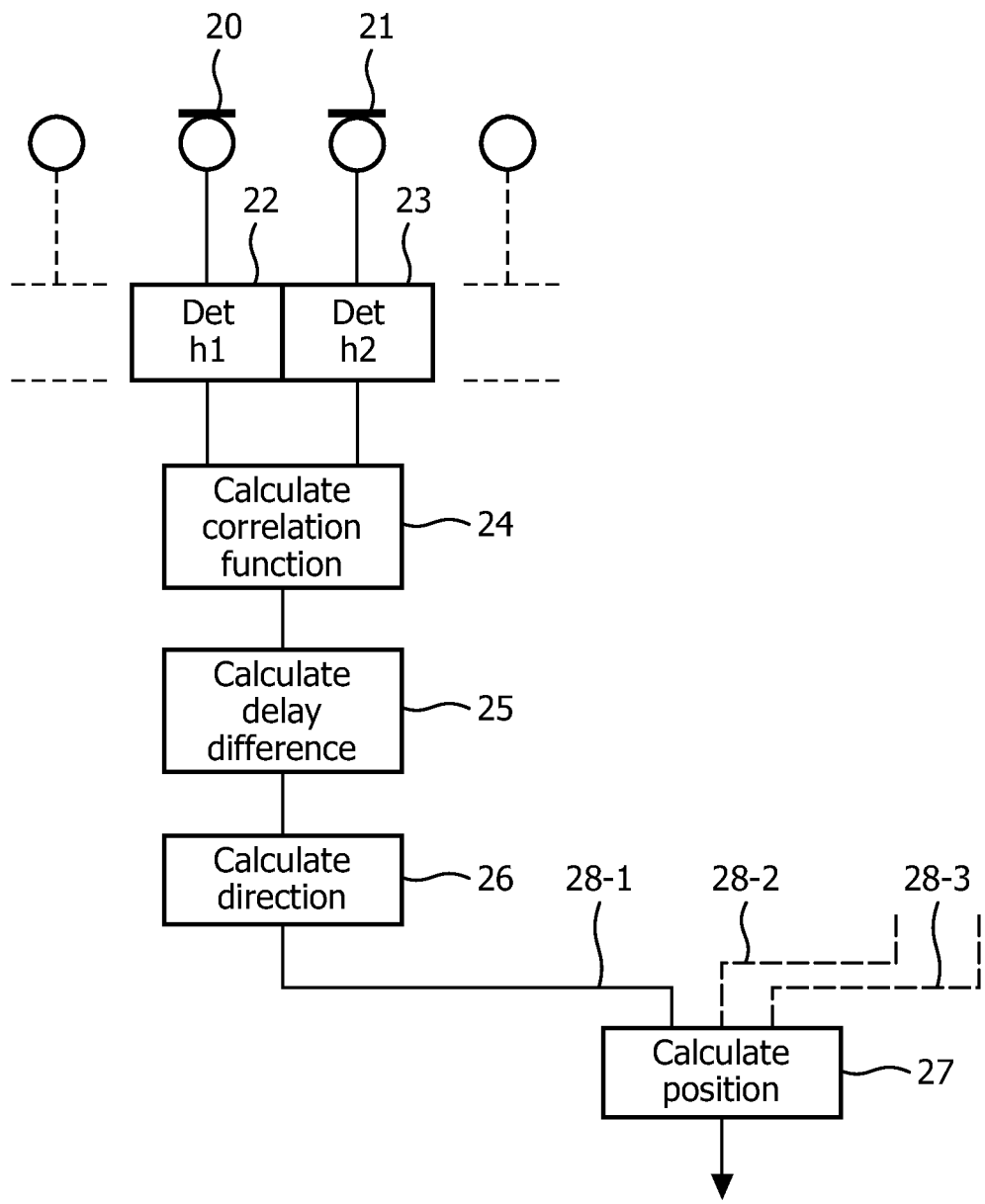
FIG. 6 illustrates an alternative, acoustic sensor.

In the example shown in FIG. 5, infrared detectors in the form of PIR sensors S are used and it will be seen that a relatively large number is needed in order to provide position detection within the space occupied by the luminaires. An alternative sensor 19 is illustrated in FIG. 6 which utilizes acoustic detectors. This detects the sound created by the commissioning actuator walking around the path. Typically, three acoustic detection units are utilized in order to triangulate sounds made by the commissioning actuator during passage along the path. One of the units is illustrated in more detail in FIG. 6 and comprises an array of at least two microphones 20, 21 that are connected to signal processors 22, 23 which detect impulse functions in electrical signals received from the microphones 20, 21 respectively. It will be appreciated that the impulse functions will have a phase difference depending on the angle of the incidence of the acoustic wave from the commissioning actuator. The processor 24 calculates a correlation function between the two impulse functions detected by detectors 22, 23 and a processor 25 calculates the time difference between them, which in turn is used to by processor 26 to compute the direction from which the sound from the commissioning actuator emanates. The position of the commission actuator can be calculated by a position calculator 27 that receives acoustic signals concurrently from three of the detecting stations on lines 28-1, 28-2, 28-3 and so is able to triangulate the position of the commissioning actuator as he or she walks around the commissioning path P1-P8. In a modification the commissioning actuator may carry a device which makes a distinctive sound that can be readily detected by the detectors 22, 23 to aid in developing accurate positional data for the path P.

Figure 7:
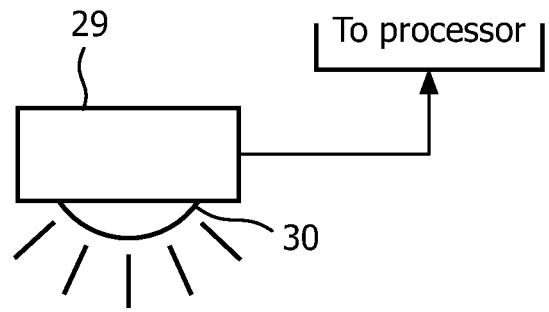
FIG. 7 illustrates an alternative, optical sensor.
Figure 8:
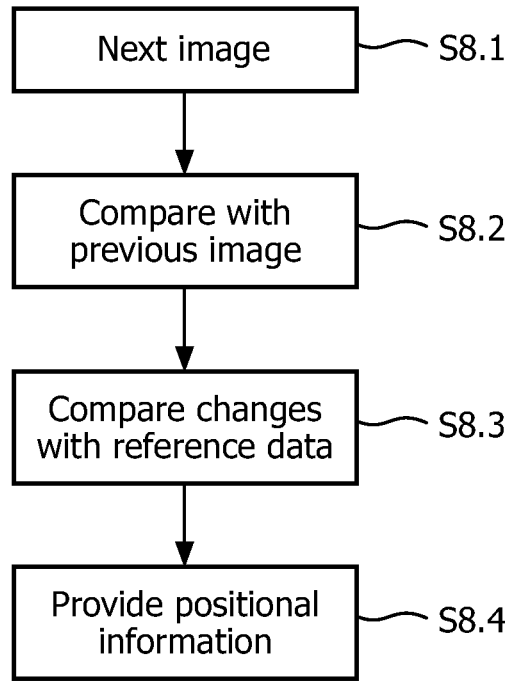
FIG. 8 is a block diagram of a process performed to derive information from the sensor of FIG. 7.

In an alternative example, the sensor 19 illustrated in FIG. 4 comprises a fish eye camera as illustrated in FIG. 7 which may for example be mounted in the middle of the array of luminaires shown in FIG. 5. The fish eye camera shown schematically in FIG. 7 comprises an image processing device 29 with a fish eye lens 30 that typically can produce an image over an approximately half-sphere (360°) field of view. The process performed by the processing device 29 comprises processing images of the field of view successively such that, as illustrated in FIG. 8, the next occurring image at step S 8.1 is compared with a previous image taken at step S 8.2, which identifies changes in the field of view. These changes are compared at step S 8.3 with reference data that relates to the static image obtained from the field of view, which has been calibrated so that positional information for changes occurring in the field of view can be developed at step S 8.4. These changes result from the commissioning actuator walking along the path P1-P8 and so in this way, coordinates for the path traversed by the commissioning actuator during the commissioning process can be monitored and provided to the central controller 2 for association with the group of luminaires.

Figure 9:
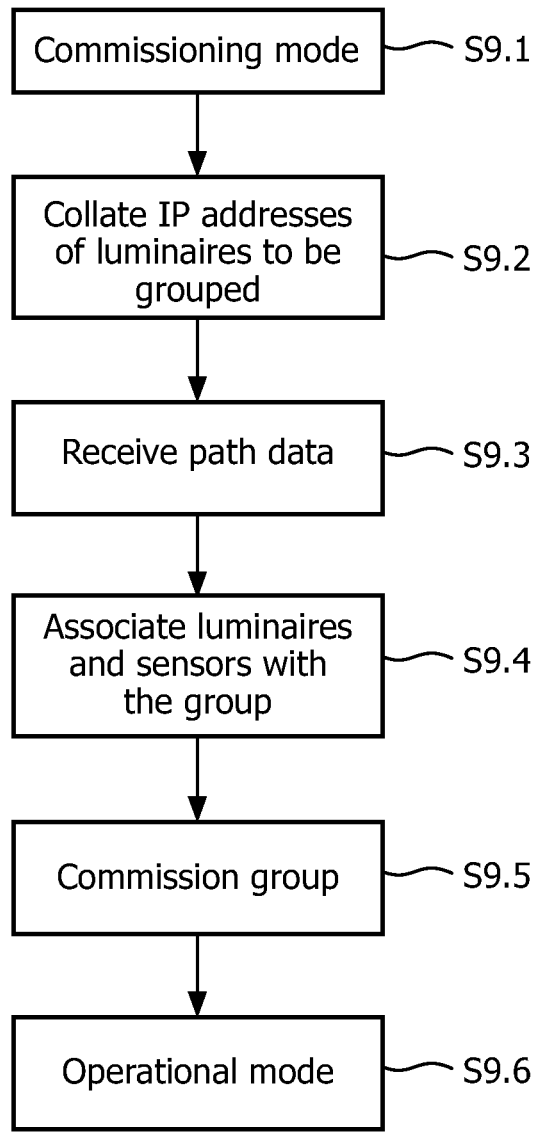
FIG. 9 is a block diagram of a commissioning process performed under the control of a program run by the central controller shown in FIG. 1.

From the foregoing, it will be understood that the controller can operate firstly in a commissioning mode and thereafter in an operational mode. The commissioning mode is performed under the control of a program held in the memory 5 of the controller 2 when the commissioner so selects through the use of control panel 7. The program performs the steps illustrated in FIG. 9. In step S9.1, the commissioning mode is selected. Then, at step S9.2 the addresses for the luminaires that have been switched on by the commissioning actuator to define the group are received by the controller 2 and associated as a group in the memory 5 under the control of the program. Thereafter, at step S9.3, the positional data corresponding to the path traversed by the commissioning actuator around the path P is received and also stored in memory 5 of the controller 2. It will be understood from the foregoing description that this positional data can be developed using the array of IR static detectors described with reference to FIG. 5 or the acoustic detector configuration described with reference to FIG. 6 or the optical detector arrangement shown in FIG. 7 or a combination of them.

Then at step S9.4, the positional data of the path is associated with the sensor addresses S for the group so that the group can be switched on or off when a person enters the region in which the luminaires of the group are located. Additionally, if desired, individual switches SW1 etc can be associated with the group so that the group of luminaires can be manually switched on and off by a local switch or the like.

It may be desirable for all of the sensors in the region to be commissioned to trigger operation of the luminaires within the region. However, the commissioning actuator when moving along the path shown in FIG. 5 will not necessarily trigger all of the sensors S within the region bounded by the path. For example the sensor associated with the area B2 will not be triggered and so cannot be associated with the group solely from the data produced by the commissioning actuator.

In one approach to deal with this issue, the coverage areas of all of the sensors can be provided to the controller 2 before the commissioning actuator moves along the path P1-P8 shown in FIG. 5. Then the processor 3 of the controller 2 can use a region filling algorithm for the data points of the path P1-P8 produced by the commissioning actuator and thereby determine that the sensor for area B2 should be associated with the defined group of luminaires.

In another approach, the commissioning actuator not only walks around the path P1-P8 but also moves around within the region encircled by the path so as to trigger all of the sensors S within the region so as to allow all of them to be associated with the group of luminaires.

Then at step S9.5, the group is commissioned as a group in the memory of the controller and the device sends switches to operational mode at step S9.6.

In the operational mode, when a person is detected as having entered into the region within the path P1-P8 defined by the commissioning actuator i.e. the region occupied by the group of luminaires, the luminaires are automatically switched on and may also be switched off when the person moves away from the group. The sensing may be performed by the PIR sensors S which can be selectively associated with the group of luminaires as described above or on the basis of positional data for the person in the workspace to determine when they enter or leave the region that has been associated with the group during the commissioning mode.

It will be appreciated that the term "comprising" does not exclude other elements or steps and that the indefinite article "a" or "an" does not exclude a plurality. A single processor may fulfill the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived there from.

Other modifications and variations falling within the scope of the claims hereinafter will be evident to those skilled in the art.

The invention claimed is:

1. A lighting system including:
    a plurality of luminaires disposed in a space to be illuminated,
    a sensor system to detect user presence within the space, and
    a controller configured in a commissioning mode to receive data corresponding to the addresses of luminaires which are to be defined as a group of luminaires, and to receive positional data from the sensor system in a response to a commissioning actuator moving along a path defining a region of the space to be associated with said group of luminaires, and
    in an operational mode to operate the luminaires of the group of luminaires in response to detecting occupancy in said region of the space.

2. The lighting system according to claim 1 wherein the luminaires, sensors and the controller are configured to communicate through a network.

3. The lighting system according to claim 2 wherein the network is an IP network.

4. The lighting system according to claim 3 wherein the network is a DALI network.

5. The lighting system according to claim 4 including an acoustic detector to provide the positional data.

6. The lighting system according to claim 5 including a plurality of the acoustic detectors to triangulate position of the commissioning actuator.

7. The lighting system according to claim 6 including an optical detector to provide the positional data.

8. The lighting system according to claim 7 including an array of presence detectors with overlapping directive patterns to provide the positional data.

9. A network controller for a lighting network that includes a plurality of luminaires disposed in a space to be illuminated and a sensor system to detect user position within the space, the controller being configured to operate:
    (a) in a commissioning mode to receive data corresponding to the addresses of luminaires which are to be defined as a group of luminaires, and to receive positional data from the sensor system in response to a commissioning actuator moving along a path defining a region of the space to be associated with the group of luminaires, and
    (b) in an operational mode to operate the luminaires of the group in response to detecting occupancy in the region of the space associated with the group of luminaires during the commissioning mode.

10. The network controller according to claim 9 wherein the region of the space is bounded by the path, and wherein the network controller is operable in the commissioning mode to receive data produced by sensor system in response to the commissioning actuator moving within the region of the space bounded by the path so as to associate all of the sensors located within the region of the space with the group of luminaires for the operational mode.

11. The network controller according to claim 9 operable in the commissioning mode to utilize a region filling routine to associate sensors located within the region of the space with the group of luminaires for the operational mode.

12. A method of commissioning a lighting system including a plurality of luminaires disposed in a space to be illuminated, and a sensor system to detect user presence within individual, different regions within the space, comprising:
    identifying which one or more of the luminaires are to be operable as a group of luminaires,
    sensing a commissioning actuator with the sensing system so as to provide positional data in response to the commissioning actuator moving along a path defining a region of the space to be associated with the group of luminaires, and commissioning the lighting system so that the luminaires of the group of luminaires are operated in response to detecting occupancy in the region of the space associated with the group of luminaires.

13. A non-transitory computer readable medium containing software, executable by a network controller, for performing the method of claim 12.

14. The method according to claim 12, wherein the region of the space is bounded by the path, the method further comprising:
receiving data in the commissioning mode produced by the sensor system in response to the commissioning actuator moving within the region of the space bounded by the path to associate all sensors located within the region of the space with the group of luminaires for an operational mode.

15. The method according to claim 12 further comprising:
utilizing a region filling routine to associate sensors located within the region with the group of luminaires for an operational mode.

\* \* \* \* \*